United States Patent [19]

Tanabe et al.

[11] Patent Number: 4,944,799
[45] Date of Patent: Jul. 31, 1990

[54] METHOD OF PRODUCING STAINLESS MOLTEN STEEL BY SMELTING REDUCTION

[75] Inventors: Haruyoshi Tanabe; Masahiro Kawakami; Kenji Takahashi; Katsuhiro Iwasaki; Shigeru Inoue, all of Tokyo, Japan

[73] Assignee: NKK Corporation, Tokyo, Japan

[21] Appl. No.: 362,418

[22] PCT Filed: Sep. 9, 1988

[86] PCT No.: PCT/JP88/00910
§ 371 Date: Apr. 25, 1989
§ 102(e) Date: Apr. 25, 1989

[87] PCT Pub. No.: WO89/02478
PCT Pub. Date: Mar. 23, 1989

[30] Foreign Application Priority Data

Sep. 10, 1987 [JP] Japan ............... 62-225254
Sep. 10, 1987 [JP] Japan ............... 62-225255
Sep. 17, 1987 [JP] Japan ............... 62-231042
Nov. 13, 1987 [JP] Japan ............... 62-285444
Dec. 26, 1987 [JP] Japan ............... 62-330979

[51] Int. Cl.$^5$ .................. C21C 5/32; C21C 5/34
[52] U.S. Cl. .................. 75/501; 75/544
[58] Field of Search ............ 75/49, 59.21, 59.15, 75/59.2, 59.22

[56] References Cited

U.S. PATENT DOCUMENTS 3,854,932 12/1974 Bishop .................................... 75/49
4,178,173 11/1979 Gorges ................................ 75/59.22
4,783,219 11/1988 Mori ..................................... 75/59.1

Primary Examiner—Peter D. Rosenberg
Attorney, Agent, or Firm—Moonray Kojima

[57] ABSTRACT

This invention relates to a method of producing stainless molten steel by a smelting reduction treatment - decarburization treatment of Cr raw materials such as Cr ores, Cr ore pellets and so on consecutively and at high treating speed in one container. In the smelting reduction, an inert gas is blown from bottom tuyeres to form an upheaving part of the molten metal on its surface and the inert gas is blown to this upheaving part. The molten metal is thereby caused to disperse into a region of the slag where the Cr materials float, so that the reduction of Cr is accelerated by C. On the other hand, decarburizing $O_2$ is blown into the molten metal from a top lance, while $O_2$ for a post combustion is blown into the slag, so that a post combustion region is formed mainly in the slag, and the slag is forcibly agitated by blowing the gas from the side tuyere, so that a heat generated by the post combustion is caused to transfer to Cr ores at high heat transfer efficiency, and a high post combustion is secured, as maintaining the post combustion ratio to be more than 0.3. After having completed the smelting reduction, the slag is discharged. The molten metal is agitated by blowing the decarburizing $O_2$ diluted with the inert gas from the top lance, and blowing the inert gas from the bottom tuyeres.

20 Claims, 14 Drawing Sheets

Smelting reduction

PC $O_2$ : $O_2$ for post combustion
DC $O_2$ : $O_2$ for decarburization

Oxygen blow for decarburization

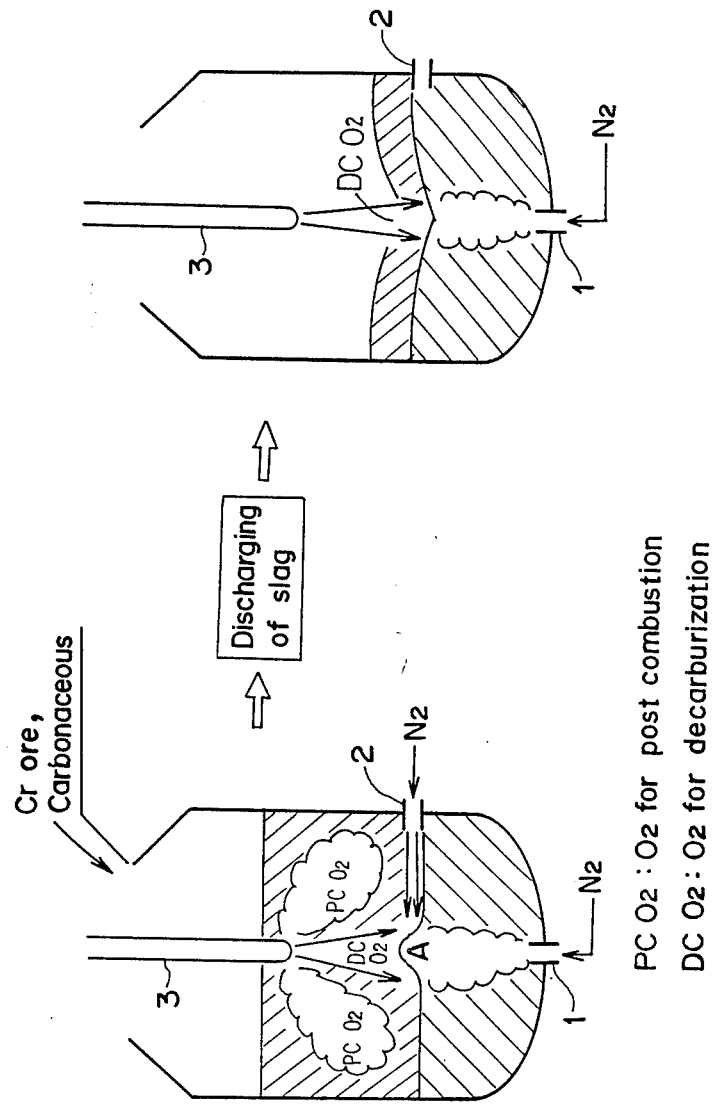
FIG_1
Smelting reduction
Oxygen blow for decarburization
PC O₂ : O₂ for post combustion
DC O₂ : O₂ for decarburization FIG_2
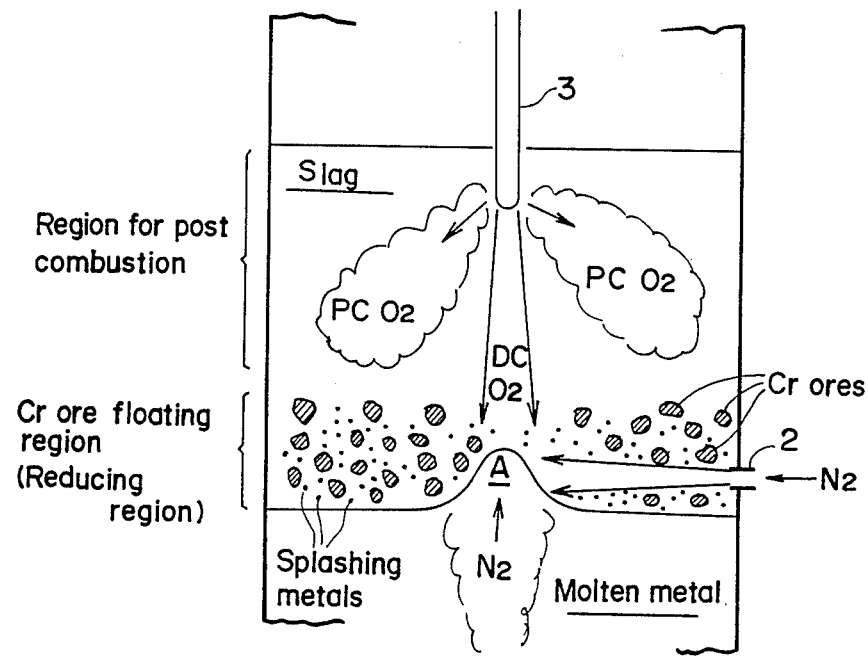
FIG_3 (a)
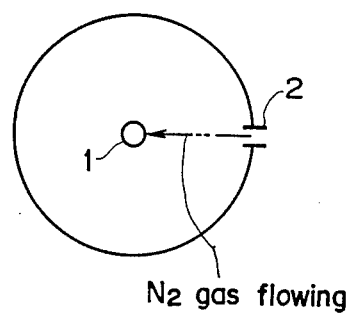
FIG_3 (b)
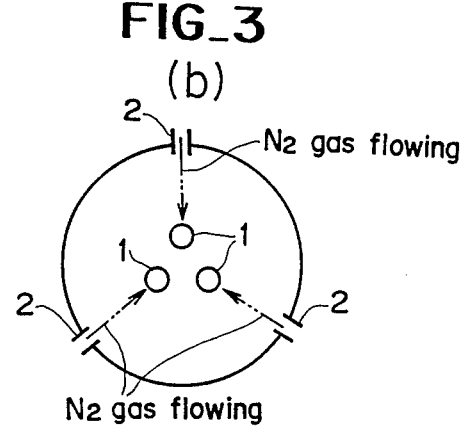

FIG_4
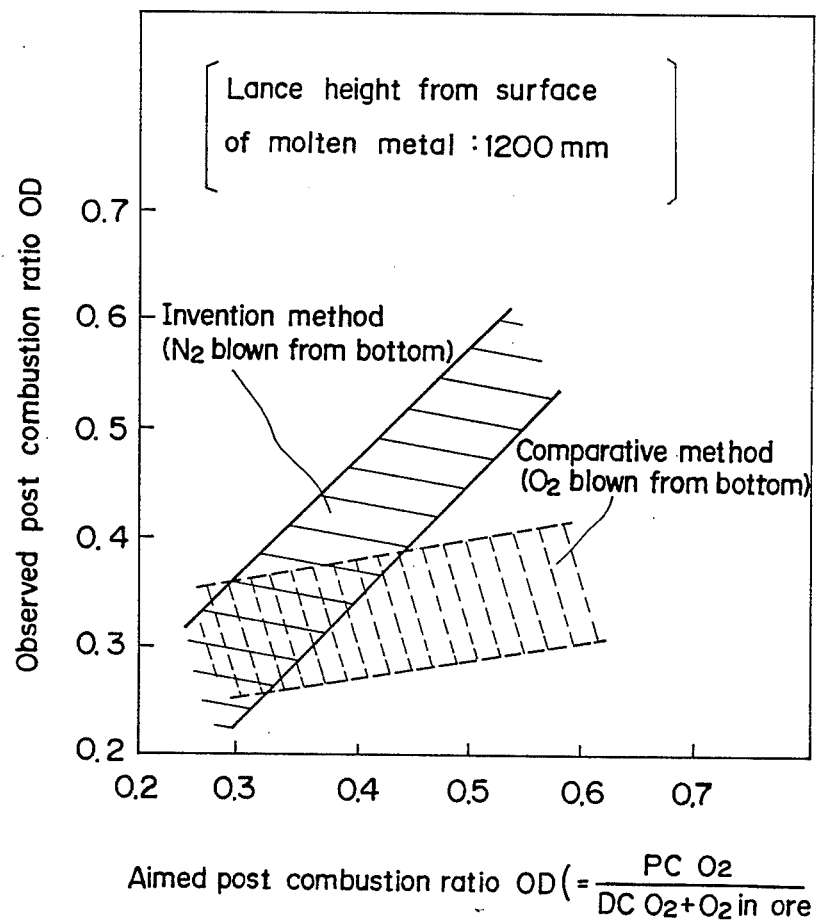

FIG_5
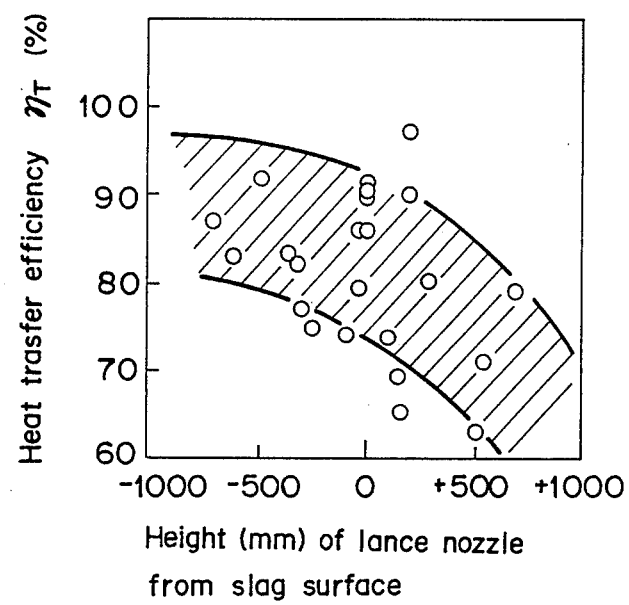
Height (mm) of lance nozzle from slag surface
FIG_6
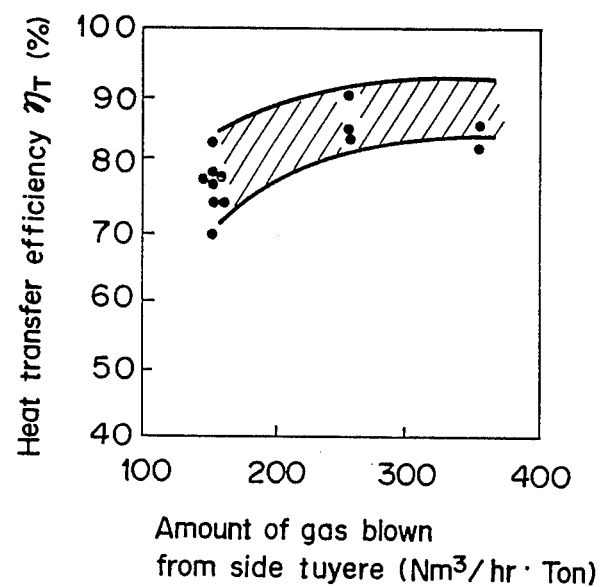
Amount of gas blown from side tuyere (Nm³/hr·Ton)

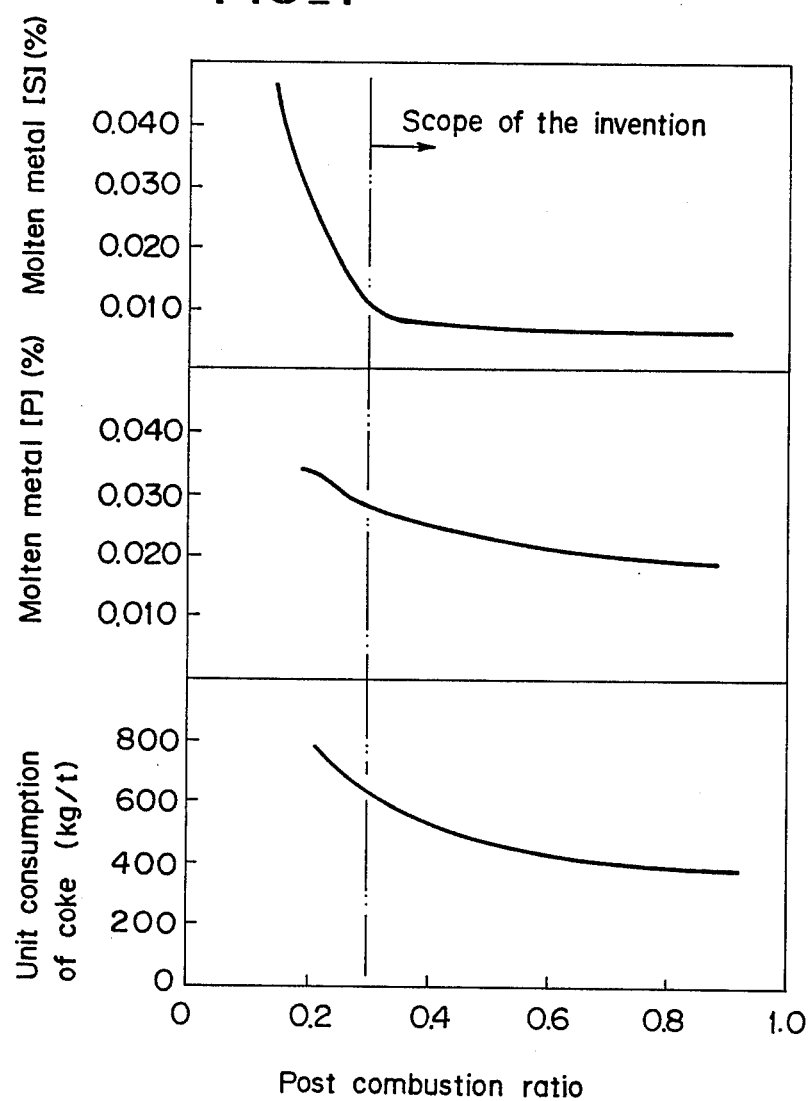
FIG_7

FIG_8
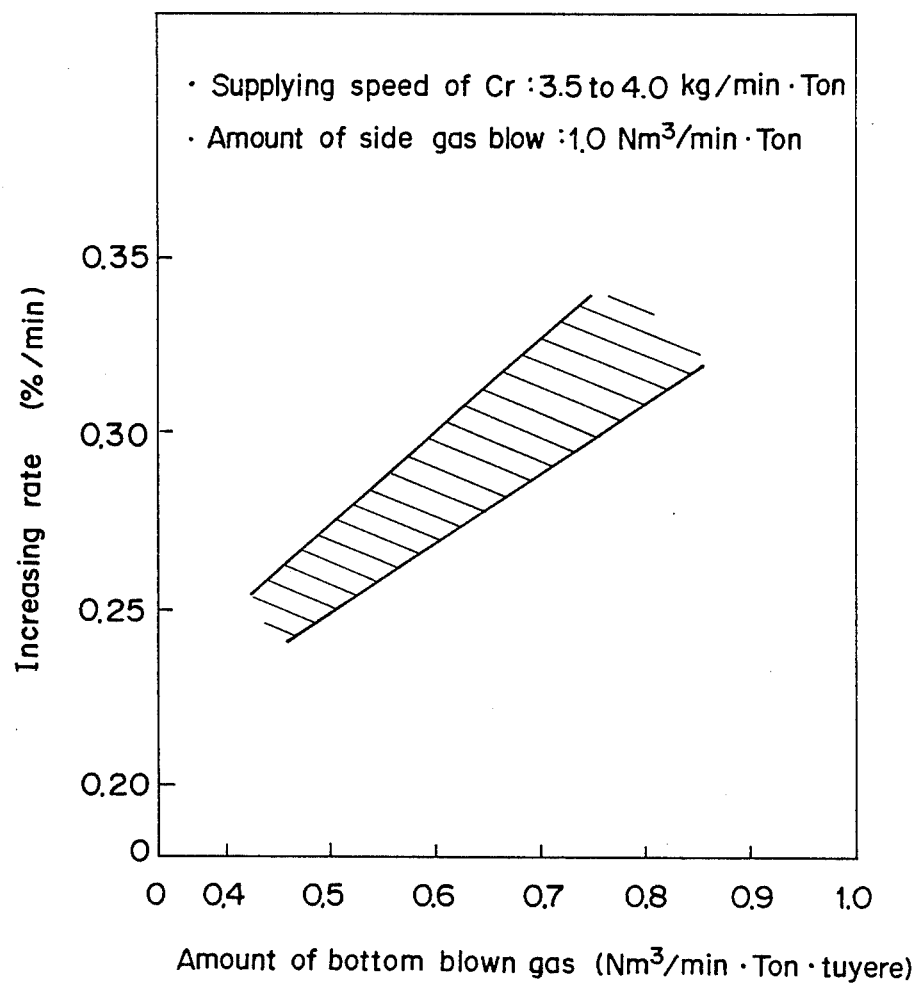

FIG_9
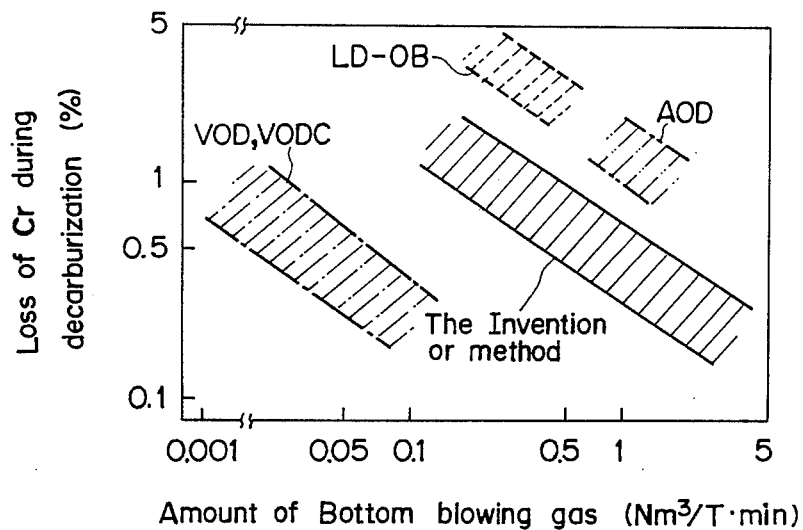
FIG_14
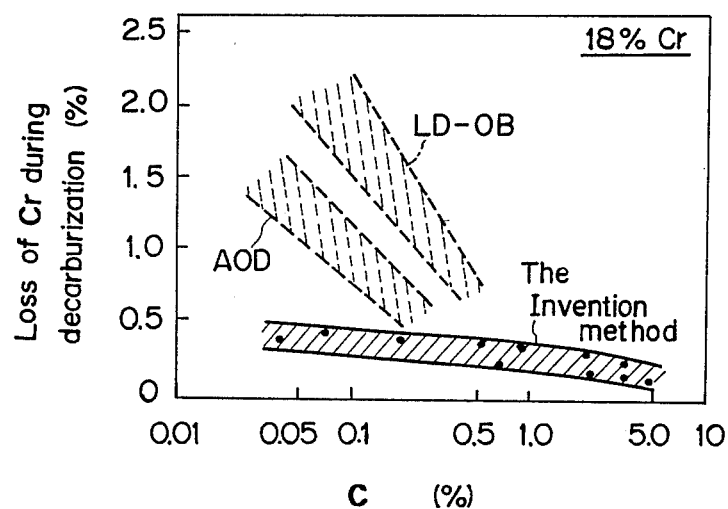

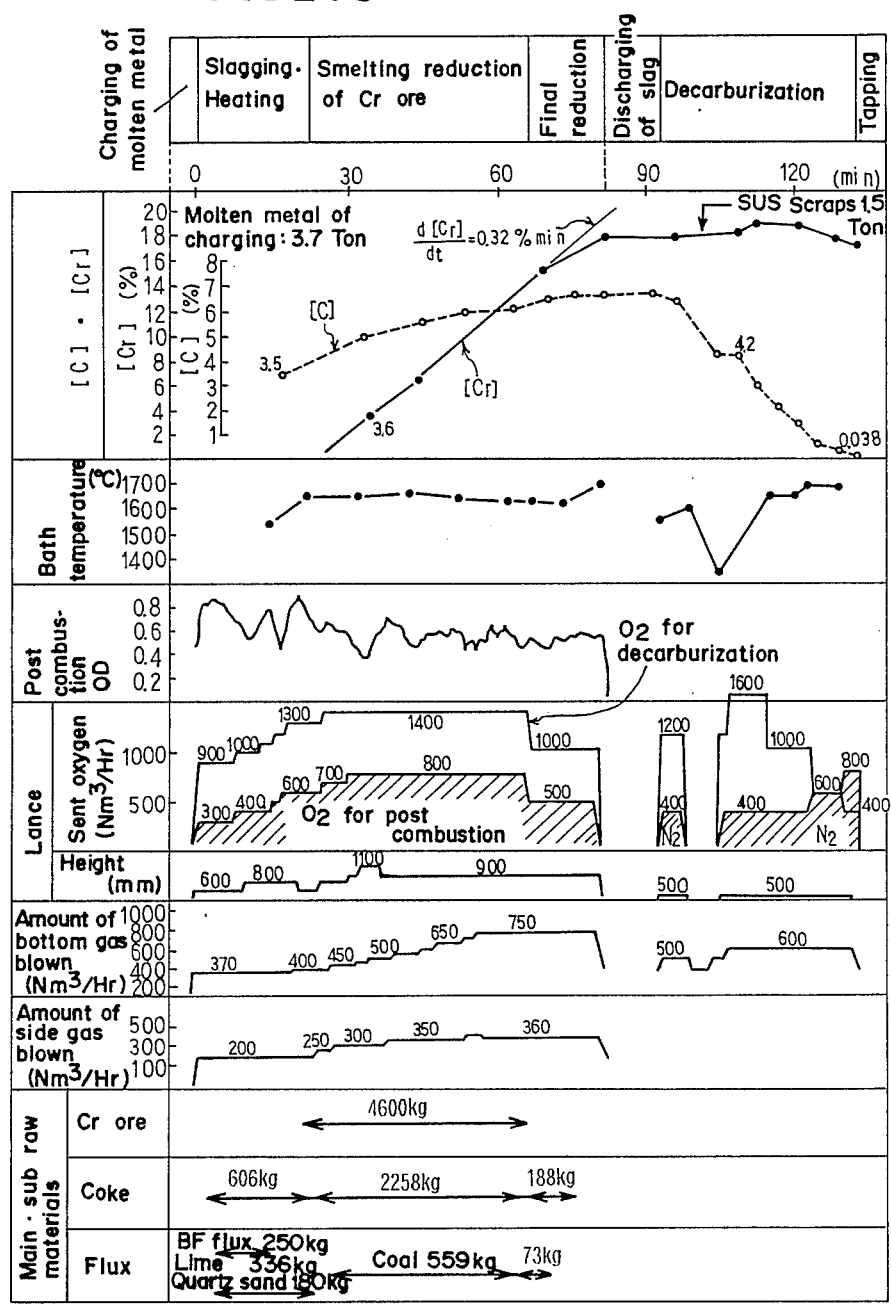
FIG_10

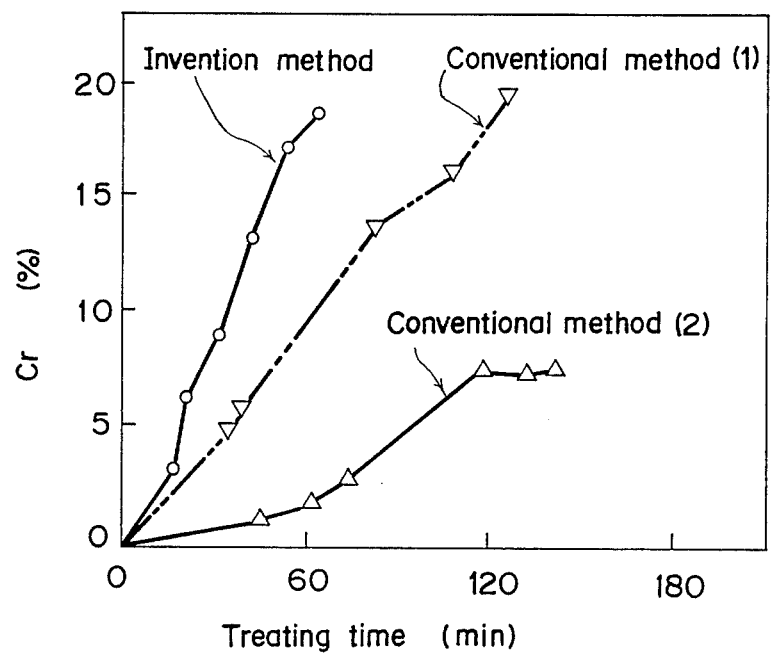
FIG_11
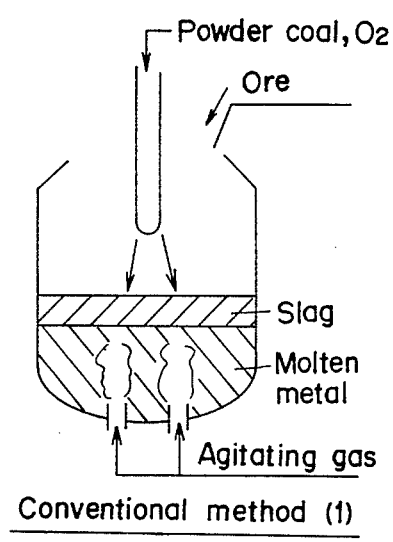
FIG_12(a)
Conventional method (1)
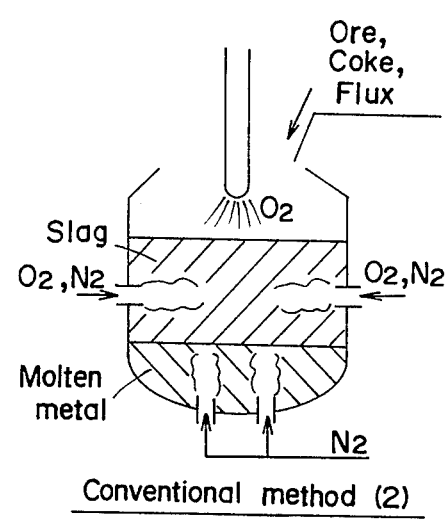
FIG_12(b)
Conventional method (2)

FIG_13
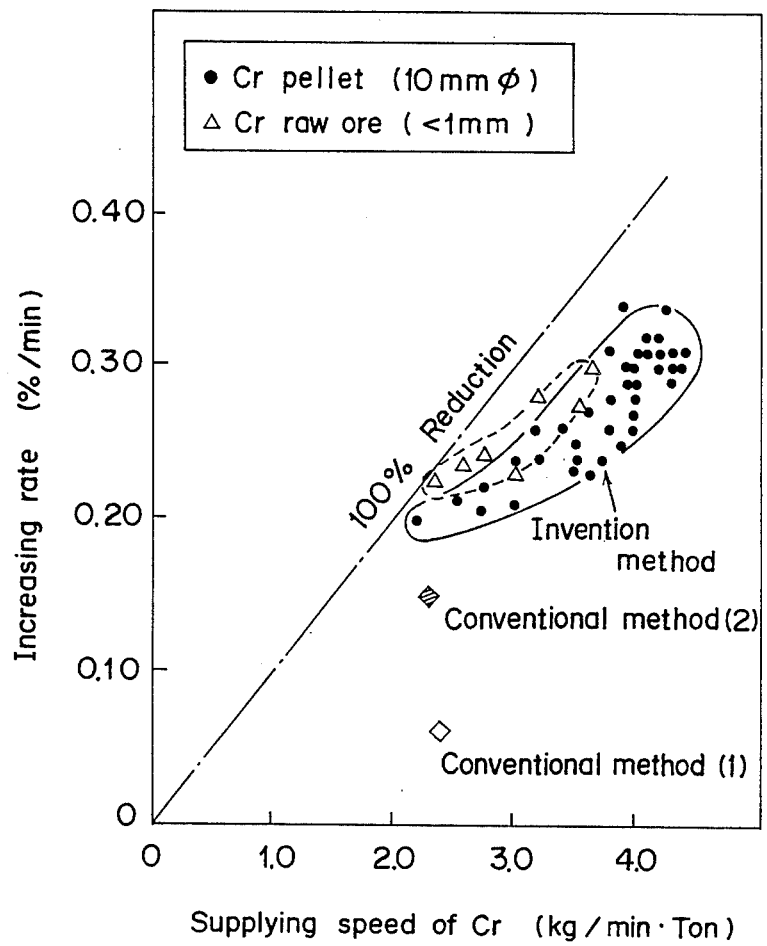

FIG_15(I)       FIG_15(II)      FIG_15(III)
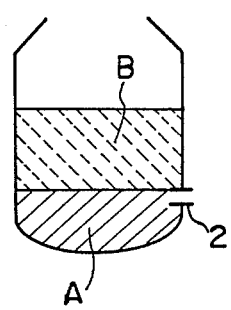 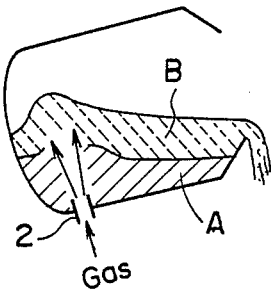 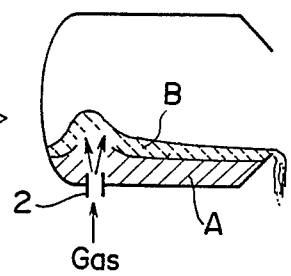
FIG_16(I)       FIG_16(II)
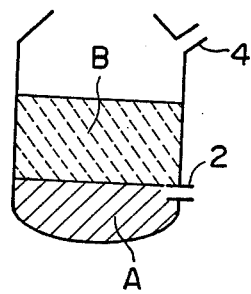 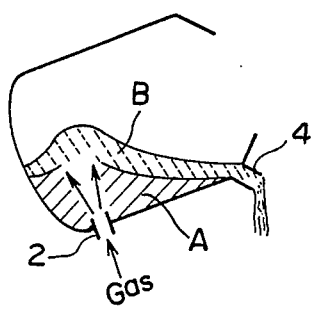
FIG_17(I)       FIG_17(II)
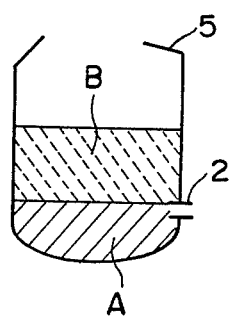 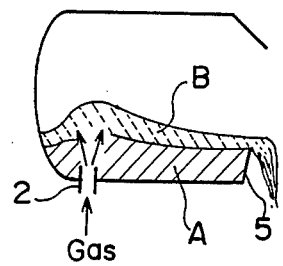

FIG_18
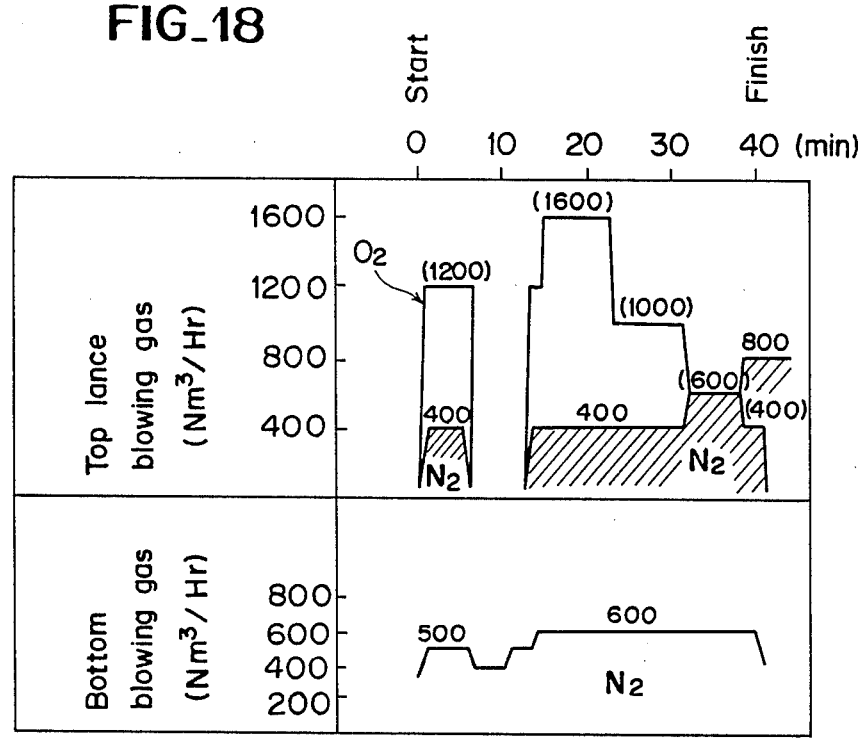
FIG_19
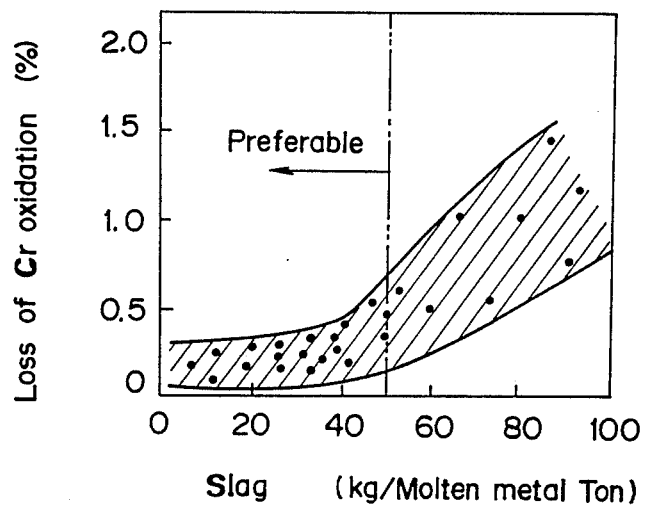

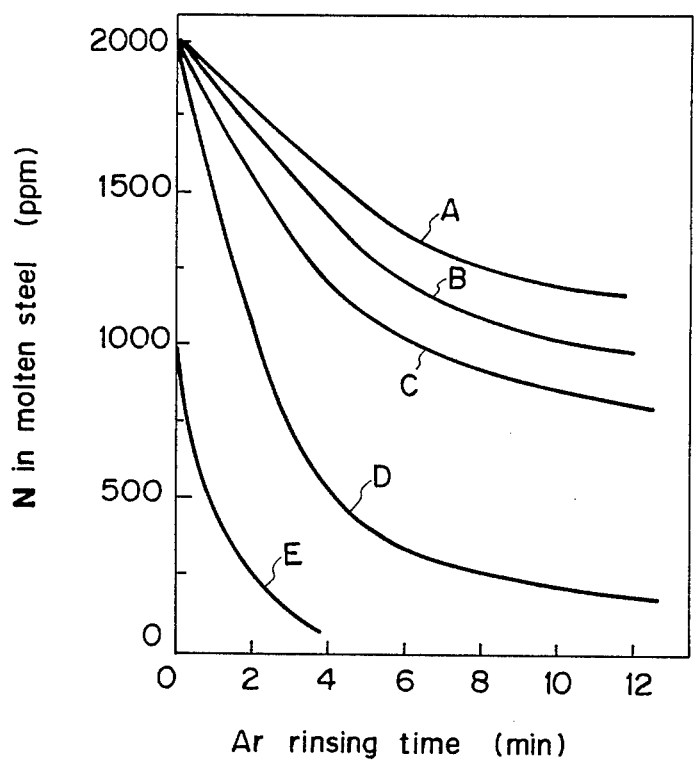
FIG_20

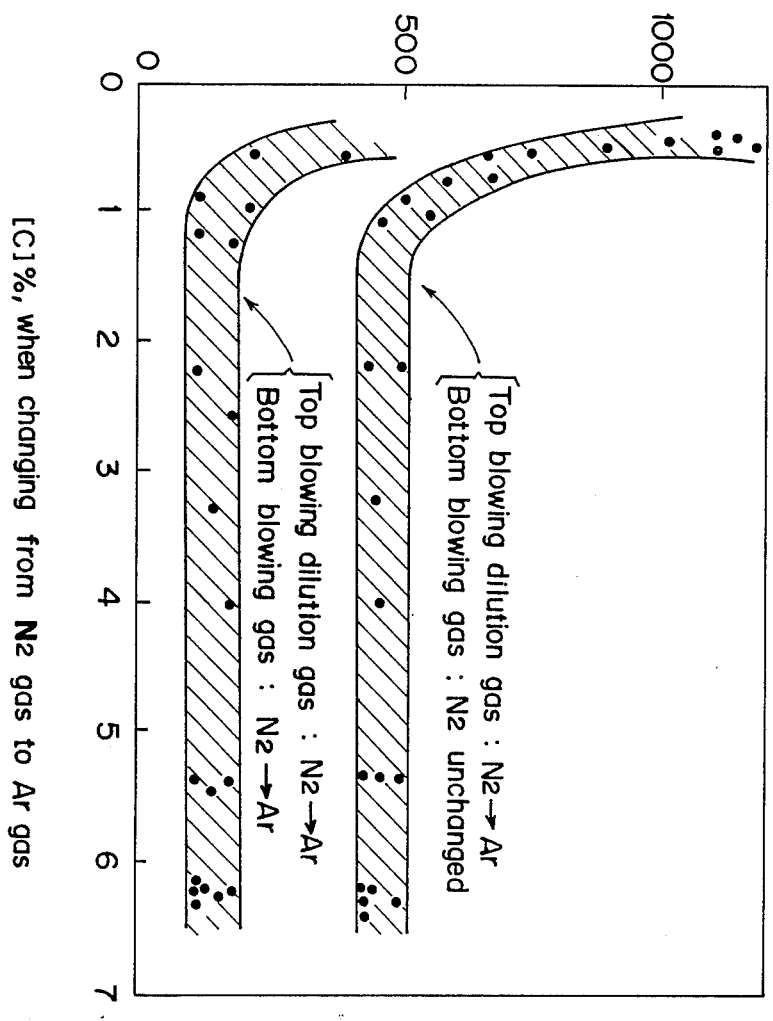

METHOD OF PRODUCING STAINLESS MOLTEN STEEL BY SMELTING REDUCTION

TECHNICAL FIELD

The present invention relates to a method of directly producing stainless molten steel from Cr ores or Cr ore pellets via a one smelting container consecutively.

BACKGROUND OF THE INVENTION

High Cr steel like stainless steel has been conventionally produced using ferrochromium as raw materials. In view of saving energy and securing low production cost, a so-called smelting reduction process is recently considered potentially attractive, which obtains high Cr molten metal directly using Cr raw ores (explanation will refer to "Cr ore" as example hereinafter). In the smelting reduction method, Cr ores, carbonaceous materials and others are supplied into a reduction furnace for directly obtaining high Cr molten metal.

For the smelting reduction method, there have been several proposals hitherto. One of them blows respectively $O_2$ from bottom tuyeres and $N_2$ from side blowing tuyeres at the same time as blowing $O_2$ from a top lance. Another of them blows respectively $O_2$ from the bottom tuyeres and $O_2$ and $N_2$ from the side tuyeres at the same time as blowing $O_2$ from the top lance. The latter is disclosed in, for example, Japanese Patent Application Laid-Open 61-279,608 (1986).

However, each of the above mentioned methods has big problems that the Cr reduction speed is low and treatments take much time. With respect to the backgrounds of the prior art, following drawbacks will be taken up.

1. The reduction of Cr ore was progressed by action of C in carbonaceous materials after Cr ore had been molten in the slag, and the melting of Cr ore was assumed to determine Cr reduction. Therefore, important technical interests for shortening the treating time were focused to specifying of the slag composition. But Cr ore was inherently less to be molten, and it was limited to speed up the reduction by accelerating the melting of Cr ore.

2. For accelerating the melting speed of Cr ore in the slag and the reduction speed, it was considered to make a post combustion of CO gas in the furnace and utilize the heat thereby. An existing method has been adopted, which blew $O_2$ for the post combustion from the furnace upper part. If the post combustion ratio was increased, the temperature of an exhaust gas went up, but there has not been a technique which efficiently tansmitted a sensitive heat of the exhaust gas to the molten metal, and as a result, a heat transfer efficiency was lowered and the exhaust gas at high temperature was removed inevitably. The heated exhaust gas considerably damaged the wall refractories and those of an exhaust gas food. Therefore, in general it has been considered that the post combustion ratio could not be heightened so much.

For finally obtaining the stainless molten steel from the Cr raw ore efficiently and economically, it is of course desirable to continuously carry out a smelting reduction and a subsequent decarburizion blowing in the same furnace. However, the prior art has not made studies on a method that the decarburizing treatment was carried out after smelting reduction in the same furnace for reasons as follows.

(1) A decarburization in the container of a converter type caused considerably loss of Cr by its oxidation (called as "Cr oxidation loss" hereinafter), and therefore although the smelting reduction was carried out in the converter, the decarburization had to depend on a vacuum system which was less in Cr oxidation loss such as RH-OB system.

(2) The decarburization required much agitating gas, but on the other hand, the existing smelting reduction method did not want the agitating gas so much. Therefore, if the container of the same converter type was used, it had been considered that a furnace for the smelting reduction had to have a structure different from that of the decarburizing container.

(3) For carrying out the treatments from the smelting reduction to the decarburization in the same container, the slag generated by the smelting reduction had to be removed, but an ordinary electric furnace could not remove the slag.

(4) It took much time for the conventional smelting reduction method and decarburization method. Accordingly, if the both treatments were performed in the same container the whole treating time was made very long and lowered the productivity, and the furnace refractory would be considerably injured, so that the operation was made difficult.

For dealing with the above stated problems of the prior art, the inventors made studies on the mechanisms of the smelting reduction and the decarburization, and the actual measures therefor, and subsequently they found following facts.

(1) As having been said above, it was assumed that Cr ore was reduced by the carbonaceous materials staying in the slag after Cr ore had been molten in the slag, but it has been found that almost all of the actual reductions were made by actions of C as the reducing material. Therefore, the reduction speed was determined by contacting of the molten metal to Cr ore heated at the high temperature, not by melting of Cr ore into the slag, so that the reduction speed could be effectively heightened by positively contacting of the molten metal to the ores, (2) It was basic concept in the prior art that the post combustion could not be largely heightened in view of the technical limit with respect to increasing of the heat transfer efficiency and consumption of the refractories. If $O_2$ was blown so that the post combustion was mainly caused in the slag to forcibly agitate the slag, the heat transfer efficiency could be heightened effectively. Thus, by the high post combustion and the high heat transfer efficiency, the temperatures of the slag and Cr ore in the slag were heightened, and the reduction speed of Cr ore by C (in the molten metal) expressed by an under formula, may be raised effectively

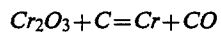

$$Cr_2O_3 + C = Cr + CO$$

(3) The foregoing technique sometimes carried out the bottom blowing of $O_2$ in a certain period or in a full term, but such blowing was harmful to the post combustion. That is, if $O_2$ was blown from the bottom, CO gas was much generated in the molten metal and agitated the molten metal was agitated compulsively, and splashes of the molten metal reached the region of the post combustion, and since C reacted with $O_2$, the post combustion was hindered. Therefore the bottom blowing had to be avoided, irrespective of a part and the full term of the reduction period.

(4) From the above items (1) and (2), a certain strong agitation was necessary for performing the smelting reduction efficiently, and therefore it was possible to use the container (furnace) of the same structure as the decarburizing container.

(5) If the decarburization was undertaken by a combination of the top blowing and the bottom blowing agitation under predetermined conditions, it was possible to provide the decarburizing treatment effectively in a short period of time with checking Cr oxidation loss.

DISCLOSURE OF THE INVENTION

The present invention is based on the above stated discoveries and specifies following conditions, whereby it is possible to realize the smelting reduction at high treating speed and the smelting reduction—decarburization in the same furnace.

(a) In the smelting reduction, the combination of the bottom tuyere blowing and the side tuyere blowing of the agitating gases, the molten metal is positively diffused into a region of the slag where ore exists so as to accelerate the reduction of Cr ore by C in the molten metal.

(b) In the smelting reduction, $O_2$ for the post combustion is blown independently of decarburizing $O_2$ for providing the post combustion ratio more than a predetermined level. The post combustion $O_2$ is blown into the slag from the top blowing lance for forming the post combustion region therein, and the slag is agitated complusively by the side tuyere blowing gas, and a heat generated by the post combustion is caused to transfer to Cr ores.

(c) In the smelting reduction, the side tuyere blowing gas and the bottom blowing gas are CO or inert gas, and $O_2$ gas is not used because of avoiding hindrance of the reduction by C in the molten metal and the post combustion by the top-blowing $O_2$.

(d) In the decarburization, $O_2$ is not blown from the bottom, since Cr oxidation loss is increased, and $O_2$ is blown exclusively from the top lance only. $O_2$ is not merely blown but $O_2$ diluted with the inert gas is blown from the top lance for decreasing CO partial pressure around a fire point and accelerating the decarburizing reaction. At the same time, the inert gas is blown from the bottom tuyeres to forcibly agitate the molten metal for accelerating decarburization and controlling Cr oxidation loss.

That is, the present invention employs the smelting reduction furnace which is provided with the bottom blowing tuyeres, the side blowing tuyeres and the top blowing lance, and obtains high Cr molten metal by reducing Cr raw material with C sources of the raw coal materials, blows decarburizingly the high Cr molten metal in the same furnace by blowing the gas of following items (a) to (c) during the period of the smelting reduction.

(a) blowing CO and/or inert gas from the bottom blowing tuyeres;

(b) blowing CO and/or inert gas from the side blowing tuyere such that at least a part of the flowing gas contacts an upheaval of the molten metal made by gas blown from the bottom tuyere;

(c) blowing the decarburizing $O_2$ into the molten metal from the top blowing lance and $O_2$ for the post combustion into the slag concurrently.

Cr raw materials are reduced by maintaining the ratio of the post combustion to be more than 0.3. The slag is discharged after the reduction, and the decarburizing $O_2$ diluted with the inert gas is blown from the top lance to the high Cr molten metal, and the inert gas is blown from the bottom tuyeres to forcibly agitate the molten metal.

The present invention is to provide a method for exactly discharging the slag which has been treated with the smelting reduction, and is characterized by tilting the converter as the side blowing nozzle faces downward and discharging the slag while blowing the gas from the lateral nozzle.

BRIEF DESCRIPTION OF THE DRAWINGS

FIG. 1 is explaining views for showing schematically the process and principle of the invention;

FIG. 2 is an explaining view for showing the smelting reduction in the invention;

FIG. 3 (a) and (b) explain preferable jetting directions of the gas from the side tuyere with respect to the bottom blowing tuyeres;

FIG. 4 shows post combustion ratios actually measured with respect to the invention method and the comparative method of $O_2$ blown from the bottom;

FIG. 5 shows a relation between the height of the top blowing lance and the heat transfer efficiency;

FIG. 6 shows a relation between the amount of the gas blown from the side tuyere and the heat transfer efficiency;

FIG. 7 shows relation between the post combustion in the furnace, S and P in the molten metal and unit consumption of coke;

FIG. 8 shows the relation of Cr increasing rate with respect to the amount of gas blown from the bottom in the invention;

FIG. 9 shows relation between the amount of bottom blowing gas and Cr oxidation loss;

FIG. 10 shows changings as the time passes, of C concentration, Cr concentration, bath temperature, post combustion ratio, amount of oxygen sent from the lance, amount of gas blown from side tuyere, and amount of supplying raw materials;

FIG. 11 shows the reduction treating time in comparison with the conventional methods;

FIG. 12 (a) and (b) are explanatory views showing the treatings of the conventional methods of FIG. 11;

FIG. 13 shows the supplying speed of Cr and Cr increasing rate in comparison with the conventional method;

FIG. 14 shows a relation between the decarburizing level and the Cr oxidation loss in the invention;

FIGS. 15 to 17 show respectively explanatory views for discharing the slag in the invention;

FIG. 18 shows the gas blowing conditions in Example 1 of the decarburizing treatment;

FIG. 19 shows influences of the slag amount to Cr oxidation loss in the decarburizing treatment;

FIG. 20 shows influences of the amount of Ar gas blown from the bottom to denitriding rate during Ar rinsing; and FIG. 21 shows relation between C content in the molten metal and N content in the molten metal after finishing the blowing when changing the diluting gas blown from the top lance and the bottom blowing gas from $N_2$ to Ar.

In the drawings, 1 is bottom blowing tuyere, 2 is side blowing tuyere, 3 is top blowing lance, and A is upheaving part of the molten metal.

DETAILED DESCRIPTION OF THE INVENTION

The invention will be explained in detail.

FIG. 1 shows schematically the invention method.

In the invention a smelting reduction furnace of a converter type is mainly used for carrying out the smelting reduction and the decarburizing treatment. Actually, the furnace has a bottom blowing tuyeres 1, a side blowing tuyere 2 and a top blowing lance 3.

According to the invention method, Cr raw materials such as Cr ores, Cr ore pellets, carbonaceous materials and fluxes are supplied to a metal bath supported in the smelting reduction furnace, and the reducing treatment is performed under following conditions.

Gas blowings by the bottom tuyere 1 and the side tuyere 2 cooperate to diffuse the molten metal into the slag and heightens the reduction speed largely.

As having mentioned above, the inventors found that the reduction of Cr ore in the slag was progressed by C in the molten metal as main of reducing substances, by which the molten metal was agitated compulsively to diffuse positively into the slag (range where Cr ores float) so as to increase the reducing rate. Therefore, in the invention, the agitating gas is supplied from the bottom blowing tuyere 1 to form an upheaving part (A) on the metal surface. At the same time, the agitating gas is supplied from the side tuyere 2 so that at least one part of the gas contacts the upheaving part (A), whereby the part (A) is splashed into the slag. An apparent specific gravity of the slag is ordinarily 0.3 to 0.5, and a bulk specific gravity of the Cr ore is about 3.0. Therefore, Cr ore in the slag gather around the lower region of the slag and float there as seen in FIG. 2. If the upheaving part of the molten metal is splashed by the side blowing gas, the splashed one is diffused around the lower region of the slag where Cr ores exist as shown in FIG. 2, and C in the splashed one reduces $Cr_2O_3$, and thus the high reducing speed may be effected. For providing such effects, it is of course necessary that the agitation must be caused compulsively by blowing more gas from the both of the bottom tuyere and the side tuyeres, and an amount of gas to be blown is determined in response to the amount and the depth of the molten metal. FIG. 8 shows the relationship between the amount of the gas blown ($Nm^3$/min/ton of molten metal/one tuyere) from the bottom tuyere and Cr increasing rate in the molten metal, from which is seen that Cr increasing rate, that is, Cr reducing rate is heightened in accordance with increasing of the amount of the bottom blowing gas, and an effective reducing reaction takes place.

For obtaining such a behavior, it is preferable that the side blown gas exactly blows against the upheaving part (A) in the vertical directions and in the horizontal directions. For example, it is desirable that the bottom blowing tuyere or tuyeres 1 and the side blowing tuyere or tuyeres 2 in the positional relation as shown in FIGS. 3 (a) and (b).

The side tuyere blowing gas also agitates the slag where the post combustion region is formed, in addition to the diffusion of the molten metal as said above, which will be referred to later.

The side tuyere blowing gas and the bottom blowing gas to be employed are limited to CO and the inert gas ($N_2$ or Ar), and $O_2$ is not used for following reasons.

If $O_2$ is used for side tuyere blowing, it reacts with C in the molten metal splashed for reducing Cr ore, and the reduction by C in the molten metal would be hindered. In addition, if $O_2$ is used, the temperature of the refractory become high and the refractory is damaged.

Further, if $O_2$ is used for the bottom blowing, CO gas is much caused in the molten metal and the molten metal is agitated exceedingly. As a result, the splash reaches the post combustion region (refer to FIG. 2), and C in the molten metal reacts with later mentioned $O_2$ for the post combustion so that the post combustion is hindered. Besides, if $O_2$ is used, a cooling gas (such as $C_3H_8$) must be added for the refractory whose temperature rises too much, so that the bottom blowing gas is increased and splashes of the molten metal by the compulsive agitation are accelerated. FIG. 4 shows the investigations of the (actually measured) post combustion ratio to the determined post combustion ratio ($PCO_2/(DCO_2+O_2$ in ores)) with respect to the bottom blowing $N_2$ of the invention method and the bottom blowing $O_2$ of the comparative example, instead of $N_2$. It is seen that the post combustion is hindered by $O_2$ blown from the bottom.

CO as the agitating gas and $N_2$ and Ar as the inert gas may be used independently or in mixture.

The decarburizing $O_2$ is blown into the molten metal from the top lance 3, and concurrently $O_2$ for the post combustion is blown into the slag. The top blowing lance 3 is provided with a nozzle hole for the decarburizing $O_2$ and a nozzle hole for the post combustion $O_2$. The post combustion $O_2$ is supplied obliquely outside than the decarburizing $O_2$.

In the invention, a high post combustion is provided, while the post combustion region is formed mainly within the slag. The post combustion region is thus formed in the slag, and the slag is forcibly agitated by blowing the gas from the side tuyere, whereby the high heat transfer efficiency is provided while the high post combustion is secured. Therefore, the post combustion $O_2$ must be blown into the slag such that the post combustion is formed in the slag.

Actually, it is necessary that the height of the top blowing lance is determined at an appropriate level with respect to the levels of the slag or the molten metal. That is, the nozzle hole of the top blowing lance 3 can be positioned above a slag surface or thereunder. If it were too high, the post combustion region would not be formed in the slag so that the heat transfer efficiency is lowered. Conversely, if it were too low, the post combustion region would not be formed properly.

FIG. 5 shows the relationship between the height of an end point of the lance from the slag surface and the heat transfer efficiency, where if the lance is too high from the slag surface, a satisfied heat transfer efficiency cannot be obtained. FIG. 6 shows the relationship between the amount of the gas blown from the side tuyere and the heat transfer efficiency, where the satisfied heat transfer can be obtained by blowing much the gas from the side tuyere so as to agitate the slag forcibly.

The post combustion ratio is specified by $(CO_2+H_2O) / (CO+CO_2+H_2+H_2O)$ which is the gas content bearing on an exhausted gas. In the invention, the above mentioned reducing treatment is performed at 0.3 of the post combustion ratio. Since the high heat transfer efficiency can be effected, and if the post combustion ratio is increased as said above, a high reduction treating ability (reducing speed) can be provided. In addition, if the post combustion ratio is increased, the addition amount of the carbonaceous materials (mainly coal) can be decreased. Consequently, an initial unit of the carbonaceous materials may be decreased, and because almost all of P components in the molten metal are brought by the carbonaceous materials, P in the molten metal can be lowered. If the post combustion ratio is heightened, a gaseous desulfurization takes place vigorously, and S in the molten metal is decreased, too. Also from these view points the present invention determines the post combustion ratio to be more than 0.3. FIG. 7 shows the relationship, in the smelting reduction, between the post combustion ratio, the initial unit of the coke, and P and S contents in the molten metal, where if the post combustion ratio is maintained to be more than 0.3, the initial unit of the coal is controlled, and P and S are decreased appropriately.

The slag is discharged, after having accomplished the smelting reduction, and the decarburization blowing is carried out consecutively in the same furnace under following conditions.

(1) $O_2$ is supplied exclusively through the upper blowing lance (3), and is not through the furnace bottom.
(2) $O_2$ to be supplied is not pure but is diluted with the inert gas.
(3) The inert gas is supplied from the bottom blowing tuyeres (1).

The known AOD process employs the blowing from the side of the furnace, but it was found by the inventors' studies that $O_2$ was a great cause of the Cr oxidation loss. That is, since the static pressure is added in the $O_2$ bottom blowing, the CO partial pressure is increased, and consequently the decarburizing reaction is hindered, and the decarburizing $O_2$ oxidizes Cr. For this reason, this invention does not blow $O_2$ from the furnace bottom, but supplies it from the top blowing lance (3).

However, it was found that, if the top blowing were merely made with $O_2$, the Cr oxidation loss could not be avoided exactly. This is why the decarburizing reaction takes place most vigorously around a fire point made by blowing oxygen from the top lance, but with $O_2$ only, CO partial pressure becomes very high there, and the decarburizing reaction is obstructed and $O_2$ oxidizes Cr. Thus, the invention blows $O_2$ diluted with the inert gas ($N_2$ or Ar) from the top lance, thereby to decrease CO partial pressure around the fire point and accelerate the decarburizing reaction. It is preferable to supply much the gas from the top blowing lance for shortening the treating time.

Further, in the invention, the inert gas ($N_2$ or Ar) is blown from the bottom tuyeres 1 to forcibly agitate the molten metal and accelerate the mixture of the molten metal and $O_2$ sent from the top lance, and the effective decarburization is possible with checking the Cr oxidation loss by combination of the compulsive agitation of the metal by the inert gas from the bottom and the top blowing of $O_2$ diluted by the inert gas.

For forcibly agitating the molten metal, it is necessary to blow much the inert gas. Actually, for decreasing the Cr oxidation loss until not more than 1%, it is necessary to blow the gas of more than 0.5 $Nm^3$/ton-min (ton-min.: every minute per 1 ton of molten metal), and for decreasing the Cr oxidation loss until not more than 0.5%, it is necessary to blow the gas of more than 1 $Nm^3$/ton-min Only, if the gas amount were too much, the molten metal would be splashed. Therefore, the invention blows the gas of 0.5 to 5 $Nm^3$/ton-min, preferably 1 to 3 $Nm^3$/ton-min. FIG. 9 shows the relation between the amount of the bottom blowing gas and the Cr oxidation loss. $O_2$ is used effectively to the decarburizing reaction by much blowing the gas from the bottom, and the Cr oxidation loss is checked appropriately. For comparison, the same shows cases of the existing methods, and in the AOD, for example, the Cr oxidation loss is very large with respect to the amount of the bottom blowing gas.

It is preferable to supply much oxygen from the top lance for shortening the treating time.

The high Cr molten metal to be treated by the invention is produced by melting ferrochromium or a so-called direct molten reduction.

In the invention, an entire process from producing of Cr molten metal to producing of stainless steel may be performed in the same container rationally and at high productivity by decarburizing as mentioned above Cr molten metal produced by any of the above mentioned processes.

In the above decarburization blowing, for exactly avoiding the Cr oxidation loss, it is effective to squeeze the oxygen supply amount in accordance with decreasing of C level. However, in supplying oxygen from the top blowing lance, it is limited in view of lowering the blowing pressure to squeeze the supplying amount in the same nozzle, and the supplying amount is squeezed down to about ½ to the maximum.

For dealing with the above mentioned problem, it is preferable to increase gradually the diluting inert gas on the half way of the blowing in accordance with the decarburizing progress, and squeeze the amount of blowing the gas, thereby to enable to squeeze the oxygen supplying amount without lowering the blowing pressure extremely.

Increasing of the inert gas and squeezing of the oxygen supplying amount may be operated successively or stepwise. With respect to the gas blowing, for example, the blowing gas amount ($O_2+N_2$ or Ar) from the top lance is determined to be always 3 $Nm^3$/ton-min, and the oxygen supplying amount is squeezed as follows in response to C level.

C: more than 3% ........ 3 to 4 $Nm^3$/ton-min.
C: less than 3% to 2% ........ 2 to 3 $Nm^3$/ton-min.
C: less than 2% to 0.5% ........ 1 to 2 $Nm^3$/ton-min.
C: less than 0.5% ........ 1 $Nm^3$/ton-min.

C in the molten metal during blowing can be known by assumption by the integrating oxygen amount or measuring of solidifying temperature of the sampling molten metal.

The above mentioned matters refer to the detailed contents of the invention, and when the invention is actually practised, following processes are dealt with.

Charging - slagging . rising temperature - smelting reduction of Cr ores - discharging slag - decarburizing - tapping.

The charging process herein means to charge Fe sources such as the molten metal and form a metal bath in the furnace. In the slagging and rising temperature process, the oxygen is supplied into the bath, and the coal materials and the flux are charged to the molten metal so as to form the slag to be a reduction range of Cr ores, and the bath temperature is raised enough for the reduction. In the smelting reduction, the Cr ores, the carbonaceous materials and the flux are supplied in succession. At the end of this process, a finishing reduction is carried out without supplying the Cr ore, and the reducing treatment is accomplished when the Cr concentration reaches an objective value.

Example 1

The molten metal of 3.7 t was charged into the smelting reduction furnace of the converter type, and the smelting reduction was performed by supplying Cr ores, coke and flux, and 18% Cr molten metal of 5.5 t was produced. Subsequently, the decarburization blowing was carried out to produce the stainless molten metal. FIG. 10 shows changings of Cr and C concentrations in the metal, bath temperature and the post combustion ratio OD, the $O_2$ supplying amount, and the raw material charging amount.

FIG. 11 shows the smelting reduction time (from starting to ending) in the present example in comparison with the treating time of the conventional practices shown in FIGS. 12 (a) and (b). The conventional practice (1) blew fine powder coal and $O_2$ from the top lance, and the agitating gas from the bottom tuyeres, and the conventional practice (2) blew $O_2$ onto the slag as blowing $N_2$ from the bottom tuyeres as well as $N_2$ and $O_2$ from the side blowing tuyeres under following conditions.

The conventional practice (1)

| Top blowing $O_2$ | 1700 Nm³/Hr | (Finishing reduction period) |
|---|---|---|
| Bottom blowing $n_2$ | 350 Nm³/Hr | " |
| Molten metal | 10 Ton | |
| Cr ore | 4600 Kg | (injected from lance) |
| Coal materials | 6700 Kg | " |

The conventional practice (2)

| Top blowing $O_2$ | 1000 Nm³/Hr | (Finishing reduction period) |
|---|---|---|
| Bottom blowing $n_2$ | 120 Nm³/Hr | " |
| Lateral blowing $N_2$ | 350 Nm³/Hr | " |
| Molten metal | 5 Ton | |
| Cr ore (powder) | 5000 Kg | (onto the slag) |
| Coal materials | 3200 Kg | " |

FIG. 11 shows that the Cr concentration of the conventional practice (2) was only about 6 to 7%, while FIG. 12 shows that the Cr concentration of the conventional practice (1) reached the objective 18%, but the treatment took much time as 120 minutes. On the other hand, according to the invention, the Cr concentration reached 18% for 60 minutes being one half of that of the conventional practice (1), which tells the excellent treating function of the present invention.

FIG. 13 shows the Cr increasing speed with respect to the Cr supplying speed (supplying speed of Cr ore calculated as the Cr amount) of the invention, revealing the high Cr increasing speed in comparison with the above practices (1) and (2).

In this example, C was decarburized from 6.7 to 0.038% for about 40 minutes. As is seen, although the decarburization went down to the low carbon range, the Cr oxidation loss was so low as about 0.5%.

The invention was practised by changing the decarburizing level (under almost the same conditions as in FIG. 10), and the relationship between the decarburizing level and the Cr oxidation loss was studied, results of which are shown in FIG. 14 in comparison with the conventional processes (AOD and LD-OB), and it is seen that the Cr oxidation loss was well controlled to be low in the low carbon region.

In the method which carries out consecutively the smelting reduction and the decarburization in the same furnace, the slag much generated in the smelting reduction must be removed before the decarburizing treatment.

The slag is removed from the furnace mouth by tilting the furnace, but the slag around the furnace bottom does not get out easily. If it were removed forcibly, the molten metal would flow out and a yield would be much lost.

So, in the invention, the furnace is tilted so that the side blowing nozzle faces downward, and the slag is removed while the gas is blown from the side nozzle.

FIG. 15 shows dischargings of the slag. FIG. 15 (I) shows that the smelting reduction is finished where (A) is the metal and (B) is the slag. The furnace body is tilted so that the side blowing nozzle 2 faces downward as seen in (II) and (III) so as to discharge the slag (B) while blowing the gas (the inert gas such as $N_2$) from the side blowing nozzle 2. In such a way, the level of the slag on the furnace bottom is heightened, so that the slag only is pushed out from the furnace mouth smoothly and easily.

FIGS. 16 and 17 show examples employing the furnace suited to discharging the slag more smoothly. FIG. 16 shows the furnace body having an opening 4 at the lower part of the furnace mouth. FIG. 16 (I) shows the furnace in an upright position and FIG. 16 (II) shows the furnace in a tilted position. FIG. 17 shows that a weir 5 is provided at the furnace mouth to check the metal (A) from escaping. FIG. 17 (I) shows the furnace in an upright position and FIG. 17 (II) shows the furnace in a vertical position.

According to the above embodiments, only the slag may be discharged. When the furnace is inclined to cause the slag to flow out naturally, the residual slag amount is 40 to 50 Kg/molten metal Ton and the amount of the metal removing together with the slag is about 10 Kg/molten metal Ton. On the other hand depending upon the present invention, the residual slag amount is less than 5 Kg/molten metal Ton and the removing amount of the molten metal is less than 1 Kg/molten metal Ton.

The conventional decarburization blowing was performed under the condition of forming much the slag, and the influences of the slag amount to the Cr oxidation loss were not studied carefully and quantitatively.

On the other hand, the inventors made studies on the relations between the slag amount and the Cr oxidation loss, paying attention to the slag to be much formed. As a result, it was found that the cross relationship existed between the slag amount and the Cr oxidation loss during decarburizingly blowing, and if the blowing was done as controlling the slag amount to be low, that is, not more than 50 kg/molten metal ton, the Cr oxidation loss could be lowered effectively.

In the invention, it is assumed that the Cr oxidation loss is lowered by controlling the slag amount within the above mentioned range for reasons as follows. $O_2$ blown from the top lance causes reactions as mentioned under.

$$C \ (molten \ metal) + \tfrac{1}{2} O_2 = CO \ (gas) \tag{1}$$

$$2Cr \ (molten \ metal) + 3/2 \ O_2 = Cr_2O_3 \ (slag) \tag{2}$$

From the above formulas (1) and (2), an under formula (3) will be built.

$$Cr_2O_3 \text{ (slag)} + 3C \text{ (molten metal)} = 2Cr \text{ (molten metal)} + 3CO \text{ (gas)} \quad (3)$$

$Cr_2O_3$ generated by the top lance blowing $O_2$ is reduced by C in the molten metal.

It is important to increase the concentration of $Cr_2O_3$ in the slag for progressing the reduction of the formula (3) to the right side. For heightening the $Cr_2O_3$ concentration, it is effective to decrease the amount of the whole slag, so that the reaction of the formula (3) is made easily, and as a result, the reduction of $Cr_2O_3$ is accelerated and the Cr loss is decreased effectively. In addition, MgO composes the furnace refractory (magnesium chromium, magnesium carbon or magnesium dolomite), and the slag contains MgO around 10 to 30% by melting it. Since MgO combines with $Cr_2O_3$ and generates less fusable $MgO \cdot Cr_2O_3$ spinel, and if the slag amount is much, $Cr_2O_3$ concentration in the slag is lowered, and the reducing is difficult. The lowering effect of the Cr oxidation loss by lowering the slag amount was most remarkable when the blowing was done with the slag amount of not more than 50 kg/molten metal ton.

For practising the present method, the lesser are Si and S contents in the molten steel to be decarburized, the more advantageous is controlling (lowering) of the slag amount. In this point, in the basic decarburization of the invention, the addition amount of the reducing agent as Fe-Si can be controlled to be low, and the slag amount can be easily controlled.

DECARBURIZING TREATMENT Example 1

18% Cr molten metal of 5.5 ton was decarburized in the container in accordance with the different levels of the slag amounts gas blowing amount. The decarburization was carried out by blowing the decarburizing $O_2$ diluted by $N_2$ gas from the top lance and blowing $N_2$ gas from the bottom tuyeres and C in the molten metal was decreased from 6.5% to 0.03% for about 40 min. FIG. 18 shows the amount of the blown gas in this operation.

FIG. 19 shows the relation between the slag amount and the Cr oxidation loss obtained in this treatment. The Cr oxidation loss became low as the slag amount became low. When the slag amount ≦50 kg/molten metal ton (preferably, ≦40 kg/molten metal ton), the Cr oxidation loss lowered remarkably.

The inventors made studies on the denitrification of the molten steel when the low nitrogen stainless steel was produced, on a premise that $N_2$ was used as the agitating gas at decarburization, and found that it was very effective to nitrification of the molten metal that the deoxidizer as Fe-Si or Al was thrown after the decarburization for carrying out the rinsing treatment by much blowing Ar from the bottom tuyeres.

In general, Fe-Si or Al are thrown into the molten metal for deoxidation and Cr reduction in the slag after the decarburization, and in this regard, the agitation is practised by blowing Ar from the bottom together with said throwing of the deoxidizer, whereby N is removed from the molten steel in addition to the above mentioned Cr reduction and deoxidation. This is why N is made easy to escape together with deoxidation of the molten steel (70 to 150 ppm—less than 50ppm) by adding Fe-Si or Al, and if the molten steel is agitated by Ar, N is made easier to run away.

The above said Ar bottom blowing is performed ordinarily 0.5 to 5 $Nm^3$/min.-molten steel ton, preferably 1 to 3 $Nm^3$/min.-molten metal ton, for 5 to 10 minutes.

For more lowering N in the molten steel, in addition to the above denitrification rinsing treatment, it is preferable to use Ar gas as the diluting gas of the decarburizing $O_2$, though $N_2$ is used as the bottom blowing gas at decarburizingly blowing. Since N-absorption is most vigorous around the fire point of the lance, and if $N_2$ is used as the dilution gas, much N is molten into the steel. But, in this method, since Ar is more expensive than N, Ar is used only for the dilution gas which is enough with a little amount so as to check the increasing of the nitrogen concentration. After decarburizingly blowing the above nitrification is carried out.

The inventors found that, with respect to N in the molten steel, while the decarburization is vigorous, N is low, and when the decarburization progresses and the decarburizing speed is lower, N becomes higher remarkably. This is why CO gas generated by the decarburization absorbs N and releases it.

The higher is the C concentration in the steel, the faster is the decarburizing speed. The diluting gas of the decarburizing $O_2$ is used, and $N_2$ gas is used at first, and when C becomes low on the half way of decarburization, the diluting gas of the decarburizing $O_2$ is changed from $N_2$ to Ar and the decarburization is continued, so that the production cost can be lowered appropriately.

It is preferable to change the diluting gas of the decarburization $O_2$ and the bottom blowing gas from $N_2$ to Ar in accordance with the amount of C in the molten steel, actually, as show in FIG. 21, $N_2$ to Ar changing is desirous in the range of 0.8 to 2.0% C in the molten steel. If the changing is too early, the expensive Ar gas is required so much. Therefore, the changing be made when C is below 2.0 %. On the other hand, if the changing is too late (C concentration is too low), as shown in FIG. 1 the denitrification is unsatisfactory. So, the changing be done when C is above 0.8 %.

DECARBURIZING TREATMENT Example 2

The high Cr molten metal was decarburized by under mentioned (A) to (E) manners in the container having the top blowing lance and the bottom blowing tuyeres, followed by Ar rinsing (Fe-Si supply + Ar bottom blowing), and the stainless molten steel of Cr: 18% and C: 0.05% was produced.

(A) Decarburizingly blowing
Top blowing gas: $O_2 + N_2$ (Dilution)
Bottom blowing gas: $N_2$ (2 $Nm^3$/min.-molten steel ton) Ar rinse
Bottom blowing gas: Ar (0.1 $Nm^3$/min.-molten metal ton)

(B) Decarburizingly blowing
Top blowing gas: $O_2 + N_2$ (Dilution)
Bottom blowing gas: $N_2$ (2 $Nm^3$/min.-molten steel ton) Ar rinse
Bottom blowing gas: Ar (0.5 $Nm^3$/min.-molten metal ton)

(C) Decarburizingly blowing
Top blowing gas: $O_2 + N_2$ (Dilution)
Bottom blowing gas: $N_2$ (2 $Nm^3$/min.-molten steel ton) Ar rinse
Bottom blowing gas: Ar (1 $Nm^3$/min.-molten metal ton)

(D) Decarburizingly blowing
Top blowing gas: $O_2+N_2$ (Dilution)
Bottom blowing gas: $N_2$ (2 $Nm^3$/min.-molten steel ton) Ar rinse
Bottom blowing gas: Ar (2 $Nm^3$/min.-molten metal ton)

(E) Decarburizingly blowing
Top blowing gas: $O_2+Ar$ (Dilution)
Bottom blowing gas: $N_2$ (2 $Nm^3$/min.-molten steel ton) Ar rinse
Bottom blowing gas: Ar (2 $Nm^3$/min.-molten metal ton)

FIG. 20 shows the influences of the amount of gas blown from the bottom to the denitrifying speed during Ar rinsing. In any way, the molten metal is denitrified effectively by Ar rinse. In (D) case, where Ar gas is 2 $Nm^3$/min.-molten steel ton, the denitrification reaches an objective value of N: 500 to 600 ppm for the rinsing time of 4 to 5 min. In (E) case where Ar is used as the $O_2$ diluting gas at decarburization, N concentration is about 1000 ppm of half of (A) to (D) cases when the decarburization is finished, and therefore the denitrification reaches the objective value by the Ar rinsing for shorter period of time.

DECARBURIZING TREATMENT Example 3

The high Cr molten metal was decarburized by under mentioned (a) and (b) manners in the container having the top blowing lance and the bottom blowing tuyeres, followed by Ar rinsing (Fe-Si supply+Ar bottom blowing), and the stainless molten steel of Cr: 18% and C: 0.05% was produced.

(a) Decarburizingly blowing
Top blowing gas: $N_2$ was used as the dilution gas of the decarburizing $O_2$ at the beginning of decarburization, and changed to Ar in accordance with values of C in the molten steel during decarburizingly blowing.
Ar rinse
Ar supply: 2 $Nm^3$/min.-molten steel ton for 5 minutes (b) Decarburizingly blowing
Top blowing gas: $N_2$ was used as the dilution gas of the decarburizing $O_2$ and the bottom blowing gas at the beginning of decarburization, and changed to Ar in accordance with values of C in the molten steel during decarburizingly blowing.
Ar rinse
Ar supply: 2 $Nm^3$/min.-molten steel ton for 5 minutes FIG. 21 shows the influences to N in the molten steel when changing the gas sorts of the dilution gas of the decarburizing $O_2$ and the bottom blowing gas.

Table 1 shows the concentrations of N in the steel after the Ar rinsing (changing of $N_2$-Ar during decarburizingly blowing was done at C in the molten steel=1%), and it is seen that the low N stainless steel of below 200 ppm is easily produced according to the invention.

TABLE 1

|  | N in the molten steel after decarburizingly blowing | N in the molten steel after Ar rinsing |
| --- | --- | --- |
| (a) | 500 ppm | 130 ppm |
| (b) | 150 ppm | 50 ppm |

INDUSTRIAL APPLICABILITY

The present invention is applicable to a process which directly produces stainless molten steel from raw Cr material as Cr ores, Cr ore pellets and so on consecutively in a one container.

What is claimed is:

1. A method of producing stainless molten steel by smelting reduction in a smelting reduction furnace comprising a bottom tuyere, a side tuyere, and a top lance comprising a first outlet and a second outlet; said method comprising the steps of
reducing raw chromium ore in said furnace by use of carbonaceous material to produce chromium molten metal at the bottom of said furnace and having slag above said molten metal;
blowing CO and/or inert gas through said bottom tuyere into said molten metal to cause agitation thereof;
blowing CO and/or inert gas through said side tuyere into said molten metal so as to contact said agitated molten metal;
concurrently blowing decarburizing oxygen through said first outlet of said top lance into said molten metal and post combustion oxygen through second outlet of said top lance into said slag, so that said molten metal is decarburized;
reducing chromium material by maintaining a ratio of post combustion to be more than 0.3;
discharging said slag after completion of reduction; and
after discharging of the slag concurrently blowing a decarburizing oxygen diluted with an inert gas through one of said outlets of said top lance into said molten metal and blowing an inert gas through said bottom tuyere into said molten metal so as to agitate forcibly said molten metal.

2. The method of claim 1, wherein said decarburizing oxygen and post combustion oxygen are blown respectively through said first and second outlets of said top lance positioned close to the surface of said slag.

3. The method of claim 2, wherein said decarburizing oxygen is blown through said first outlet in a flow located inside the flow of post combustion oxygen blown through said second outlet.

4. The method of claim 1, wherein after the slag is discharged, inert gas is blown through the bottom tuyere in an amount of more than 0.5 $Nm^3$/molten metal Ton-min.

5. The method of claim 4, wherein the amount is more than 1 $Nm^3$/molten metal Ton-min.

6. A method of producing stainless molten steel by smelting reduction in a smelting reduction furnace comprising a bottom tuyere, a side tuyere, and a top lance comprising a first outlet and a second outlet; said method comprising the steps of
reducing raw chromium ore in said furnace by use of carbonaceous material to produce chromium molten metal at the bottom of said furnace and having slag above said molten metal;
blowing CO and/or inert gas through said bottom tuyere into said molten metal to cause agitation thereof;
blowing CO and/or inert gas through said side tuyere into said molten metal so as to contact said agitated molten metal;
concurrently blowing decarburizing oxygen through said first outlet of said top lance into said molten metal and post combustion oxygen through said second outlet of said top lance into said slag, so that said molten metal is decarburized;

reducing chromium material by maintaining a ratio of post combustion to be more than 0.3;

discharging said slag after completion of reduction; and after discharging of the slag, concurrently blowing an inert gas through said bottom tuyere into said molten metal so as to agitate forcibly said molten metal and blowing a decarburizing oxygen diluted with an inert gas through one of said outlets of said top lance into said molten metal wherein the ratio of decarburizing oxygen and diluting inert gas is changed by gradually reducing the amount of decarburizing oxygen and while gradually increasing the amount of inert gas at the half-way point in time of the blowing of such decarburizing oxygen and diluting inert gas.

7. The method of claim 6, wherein said decarburizing oxygen and post combustion oxygen are blown respectively through said first and second outlets of said top lance position close to the surface of said slag.

8. The method of claim 7, wherein the decarburizing oxygen is blown through said first outlet in a flow located inside the flow of post combustion oxygen blown through said second outlet.

9. The method of claim 6, wherein after the slag is discharged, inert gas is blown through the bottom tuyere in an amount of more than 0.5 $Nm^3$/molten metal Ton-min.

10. The method of claim 9, wherein the amount is more than 1 $Nm^3$/molten metal Ton-min.

11. A method of producing stainless molten steel by smelting reduction in a smelting reduction furnace comprising a bottom tuyere, a side tuyere, and a top lance comprising a first outlet and a second outlet; said method comprising the steps of reducing raw chromium ore in said furnace by use of carbonaceous material to produce chromium molten metal at the bottom of said furnace and having slag above said molten metal;

blowing CO and/or inert gas through said bottom tuyere into said molten metal to cause agitation thereof;

blowing CO and/or inert gas through said side tuyere into said molten metal so as to contact said agitated molten metal;

concurrently blowing decarburizing oxygen through said first outlet of said top lance into said molten metal and post combustion oxygen through said second outlet of said top lance into said slag, so that said molten metal is decarburized;

reducing chromium material by maintaining a ratio of post combustion to be more than 0.3;

tilting said furnace so that the side tuyere faces downward after completion of the reduction so as to remove said slag while blowing gas through said side tuyere; and after removing said slag, concurrently blowing a decarburizing oxygen diluted with an inert gas through one of said outlets of said top lance into said molten metal and blowing an inert gas through said bottom tuyere into said molten metal so as to agitate forcibly said molten metal.

12. The method of claim 11, wherein said decarburizing oxygen and post combustion oxygen are blown respectively through said first and second outlets of said top lance position close to the surface of said slag.

13. The method of claim 12, wherein said decarburizing oxygen is blown through said first outlet in a flow located inside the flow of post combustion oxygen blown through said second outlet.

14. The method of claim 11, wherein after the slag is removed, inert gas is blown through the bottom tuyere in an amount of more than 0.5 $Nm^3$/molten metal Ton-min.

15. The method of claim 14, wherein the amount is more than 1 $Nm^3$/molten metal Ton-min.

16. A method of producing stainless molten steel by smelting reduction in a smelting reduction furnace comprising a bottom tuyere a side tuyere, and a top lance comprising a first outlet and second outlet; said method comprising the steps of reducing raw chromium ore in said furnace by use of carbonaceous material to produce chromium molten metal at the bottom of said furnace and having slag above said molten metal;

blowing CO and/or inert gas through said bottom tuyere into said molten metal to cause agitation thereof;

blowing CO and/or inert gas through said side tuyere into said molten metal so as to contact said agitated molten metal;

concurrently blowing decarburizing oxygen through said first outlet of said top lance into said molten metal and post combustion oxygen through said second outlet of said top lance into said slag, so that said molten metal is decarburized;

reducing chromium material by maintaining a ratio of post combustion to be more than 0.3;

tilting said furnace so that the side tuyere faces downward after completion of the reduction so as to remove said slag while blowing gas through said side tuyere; and after removing of the slag, concurrently blowing an inert gas through said bottom tuyere into said molten metal so as to agitate forcibly said molten metal and blowing a decarburizing oxygen diluted with an inert gas through one of said outlets of said top lance into said molten metal wherein the ratio of decarburizing oxygen and diluting inert gas is changed by gradually reducing the amount of decarburizing oxygen and while gradually increasing the amount of inert gas at the half-way point in time of the blowing of such decarburizing oxygen and diluting inert gas.

17. The method of claim 16, wherein said decarburizing oxygen and post combustion oxygen are blown respectively through said first and second outlets of said top lance positioned close to the surface of said slag.

18. The method of claim 17, wherein said decarburizing oxygen is blown through said first outlet in a flow located inside the flow of post combustion oxygen blown through said second outlet.

19. The method of claim 16, wherein after the slag is discharged, inert gas is blown through the bottom tuyere in an amount of more than 0.5 $Nm^3$/molten metal Ton-min.

20. The method of claim 19, wherein the amount is more than 1 $Nm^3$/molten metal Ton-min.

* * * * *